United States Patent Office 3,101,332
Patented Aug. 20, 1963

3,101,332
9α-HALO-Δ¹-STEROIDS OF THE PREGNANE SERIES
Josef Fried, New Brunswick, N.J., assignor to Olin Mathieson Chemical Corporation, New York, N.Y., a corporation of Virginia
No Drawing. Filed Feb. 21, 1955, Ser. No. 489,769
16 Claims. (Cl. 260—239.55)

This application is a continuation-in-part of my parent applications, Serial No. 417,489, filed March 10, 1954, Patent No. 2,852,511, and Serial No. 343,243, filed March 18, 1953, now abandoned.

This invention relates to the synthesis of valuable steroids.

One of the objects of this invention is the provision of an advantageous process of preparing steroids of the pregnene (including the allopregnene and pregnadiene) series, unsaturated in either the 1,2 or 6,7-position, and having a 9α-halo group, and an 11β-hydroxy or 11-keto group.

Another object of this invention is the provision of steroids of the pregnene (including the allopregnene and pregnadiene) series, unsaturated in either the 1,2 or 6,7-position, and having a 9α-halo group and an 11β-hydroxy or 11-keto group, which compounds are useful either for their own physiological action or as intermediates in the preparation of physiologically-active derivatives.

Still another object of this invention is the provision of steroids of the allopregnane series having bromo substituents in the 2 or 2,4-positions, a 9α-halo group, and an 11β-hydroxy or 11-keto group, wherein the halogen has an atomic number no higher than 35, which compounds are useful intermediates in one of the processes of this invention.

The preferred 9α-halo compounds of this invention are those which are comprehended by the general formula:

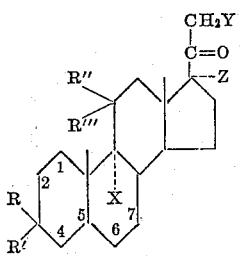

wherein one of the positions 1,2 and 6,7 is double-bonded, the 4,5 position is double-bonded or saturated (preferably double-bonded), and wherein R is hydrogen, R' is hydroxy or together R and R' is a keto or ketalized keto group (preferably the free keto group), R'' is hydrogen, R''' is β-hydroxy, or together R'' and R''' is a keto group, X is an α-halogen group, Z is hydrogen or α-hydroxy, and Y is hydrogen, hydroxy or acyloxy (e.g. a fatty acyloxy, preferably a lower alkanoyloxy, such as acetoxy, propionyloxy, heptanoyloxy, and caprylyloxy).

Representative Δ¹-allopregnenes of this invention include, inter alia, the 9α-halo-Δ¹-allopregnene-11β-ol-3,20-diones (e.g. 9α-fluoro-Δ¹-allopregnene-11β-ol-3,20-dione), the 9α-halo-Δ¹-allopregnene-3,11,20-triones (e.g. 9α-fluoro-Δ¹-allopregnene-3,11,20-trione), the 9α-halo-Δ¹-allopregnene-11β,17α-diol-3,20-diones (e.g. 9α-fluoro-Δ¹-allopregnene-11β,17α-diol-3,20-dione), the 9α-halo-Δ¹-allopregnene-17α-ol-3,11,20-triones (e.g. 9α-fluoro-Δ¹-allopregnene-17α-ol-3,11,20-trione), the 9α-halo-Δ¹-allopregnene-11β,21-diol-3,20-diones and the 21-esters thereof (e.g. the lower alkanoates, such as the 21-acetate), the 9α-halo-Δ¹-allopregnene-21-ol-3,11,20-triones and their 21-esters, the 9α-halo-Δ¹-allopregnene-11β,17α,21-triol-3,20-diones and their 21-esters, and the 9α-halo-Δ¹-allopregnene-17α,21-diol-3,11,20-triones and their 21-esters.

Representative Δ⁶-allopregnenes of this invention correspond to those listed in the preceding paragraph with the double bond in the 6,7-position instead of the 1,2-position.

Representative Δ¹,⁴-pregnadienes of this invention include, inter alia, the 9α-halo-Δ¹,⁴-pregnadiene-11β-ol-3,20-diones (e.g. 9α-fluoro-Δ¹,⁴-pregnadiene-11β-ol-3,20-dione and 9α-chloro-Δ¹,⁴-pregnadiene-11β-ol-3,20-dione), the 9α-halo-Δ¹,⁴-pregnadiene-3,11,20-triones (e.g. 9α-fluoro-Δ¹,⁴-pregnadiene-3,11,20-trione and 9α-chloro-Δ¹,⁴-pregnadiene-3,11,20-trione), the 9α-halo-Δ¹,⁴-pregnadiene-11β,17α-diol-3,20-diones (e.g. 9α-fluoro-Δ¹,⁴-pregnadiene-11β,17α-diol-3,20-dione and 9α-chloro-Δ¹,⁴-pregnadiene-11β,17α-diol-3,20-dione), the 9α-halo-Δ¹,⁴-pregnadiene-17α-ol-3,11,20-triones (e.g. 9α-fluoro-Δ¹,⁴-pregnadiene-17α-ol-3,11,20-trione and 9α-chloro-Δ¹,⁴-pregnadiene-17α-ol-3,11,20-trione), the 9α-halo-Δ¹,⁴-pregnadiene-11β,21-diol-3,20-diones (e.g. 9α-fluoro-Δ¹,⁴-pregnadiene-11β,21-diol-3,20-dione and 9α-chloro-Δ¹,⁴-pregnadiene-11β,21-diol-3,20-dione) and the 21-esters thereof (e.g. the 21-lower alkanoates such as the 21-acetate and 21-propionate), the 9α-halo-Δ¹,⁴-pregnadiene-21-ol-3,11,20-triones (e.g. 9α-fluoro-Δ¹,⁴-pregnadiene-21-ol-3,11,20-trione and 9α-chloro-Δ¹,⁴-pregnadiene-21-ol-3,11,20-trione) and the 21-esters thereof, the 9α-halo-Δ¹,⁴-pregnadiene-11β,17α,21-triol-3,20-diones (i.e. 9α-fluoro-Δ¹,⁴-pregnadiene-11β,17α,21-triol-3,20-dione, 9α-chloro-Δ¹,⁴-pregnadiene-11β,17α,21-triol-3,20-dione, 9α-bromo-Δ¹,⁴-pregnadiene-11β,17α,21-triol-3,20-dione, and 9α-iodo-Δ¹,⁴-pregnadiene-11β,17α,21-triol-3,20-dione) and the 21-esters thereof (e.g. 21-lower alkanoyl esters), and the 9α-halo-Δ¹,⁴-pregnadiene-17α,21-diol-3,11,20-triones (e.g. 9α-fluoro-Δ¹,⁴-pregnadiene-17α,21-diol-3,11,20-trione and 9α-chloro-Δ¹,⁴-pregnadiene-17α,21-diol-3,11,20-trione) and the 21-esters thereof (e.g. 21-lower alkanoyl esters).

Representative Δ⁴,⁶-pregnadienes of this invention are the steroids corresponding to the Δ¹,⁴-pregnadienes listed in the preceding paragraph wherein one of the double bonds is in the 6,7-position rather than the 1,2-position.

The steroids of this invention can be prepared by a number of different processes. A particularly advantageous process for forming the steroids of this invention, consists of using one of the 9α-halo, 11β-hydroxy or 11-keto steroids disclosed in the aforementioned applications as a starting material. Representative of these steroids are the 9α-halo-11β-hydroxyprogesterones, the 9α-halo-11-ketoprogesterones, the 9α-halo-11β,17α-dihydroxyprogesterones, the 9α-halo-17α-hydroxy-11-ketoprogesterones, the 21-esters of 9α-halocorticosterone (e.g. the 21-lower alkanoyl esters, such as the 21-acetate), the 21-esters of 9α-halo-11-dehydrocorticosterone, the 21-esters of 9α-halohydrocortisone, and the 9α-halocortisones, wherein the halogen has an atomic number no higher than 35, preferably no higher than 17. One of these representative steroids is hydrogenated to saturate the 4,5 double bond to form the corresponding allopregnane derivative. This step in the process may be carried out by means of hydrogen in the presence of a palladium catalyst with or without a carrier, such as barium sulfate, charcoal, calcium carbonate, etc. Other known hydrogenation procedures can, of course be used instead. If a 9α-halo-11β-hydroxy or 11-keto allopregnane is used initially, the first step in the process can, of course, be dispensed with and the allopregnane can be used directly in the next step of the process.

According to the next step in the preferred process of this invention, the 9α-halo (wherein the halogen has an atomic number no higher than 35, preferably no higher than 17), 11β-hydroxy or 11-keto allopregnane is then brominated by means of bromine in a suitable organic solvent such as an acid [e.g. a lower alkanoic acid, such as acetic acid] or an amide [e.g. a di(lower alkyl) lower alkanoic acid amide, such as dimethyl formamide]. The structure of the resulting steroid will depend on the molar ratio of bromine to steroid employed. If one mole of bromine is used per mole of steroid, a 2-bromo derivative is produced. If two moles of bromine are employed per mole of steroid, however, a 2,4-dibromo derivative is produced as the major product. These brominated allopregnanes are new compounds, the preferred compounds being those of the general formula

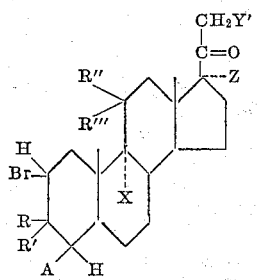

wherein Y' is hydrogen or acyloxy (e.g. a lower alkanoyloxy, such as acetoxy), A is bromo or hydrogen, and R, R', R'', R''', X, and Z are as hereinbefore defined.

The brominated allopregnanes of this invention are then dehydrobrominated. This may be done, inter alia, by heating the steroid in the presence of an organic base, such as a lower alkylated pyridine (e.g. collidine), with or without a lithium halide salt, or by treating the steroid with a lithium halide (e.g. lithium chloride) in an organic solvent, such as a lower fatty acid amide (e.g. dimethyl formamide) to form an unsaturated derivative. The degree of unsaturation in the product will depend on whether the steroid reactant is mono or dibrominated. With a monobrominated starting steroid, the compound formed exclusively is the 1,2-unsaturated derivative.

With a 2,4-dibrominated derivative, a mixture of $\Delta^{1,4}$ and $\Delta^{4,6}$ derivatives is produced, which may be separated by chromatography, as more fully detailed in the examples following.

The 9α-halo-11β-hydroxy steroids formed by the preferred process of this invention can then either be oxidized with chromic oxide in the known manner to produce the corresponding 9α-halo-11-keto derivatives, or they can be reacted with a dehydrohalogenating agent, when the halogen atom is bromine or chlorine, to form the 9β,11β-oxido derivative, as more fully disclosed hereinafter. Furthermore, if a 21-acyloxy steroid is used as the reactant in the above steps, the esterifying group in the 21-position can be hydrolyzed by heating the steroid with an alkali metal salt of carbonic acid (e.g. potassium bicarbonate or potassium carbonate) for example, in an organic solvent such as an alcohol (e.g. methanol) to form the free 21-ol.

The steroids of the pregnane (including the allopregnene and pregnadiene) series of this invention which are unsaturated in either the 1,2 or 6,7-position, and have a 9α-halo group and an 11β-hydroxy or 11-keto group are physiologically-active compounds which possess glucocorticoid as well as mineralocorticoid activity. Thus, the new steroids of this invention can be administered instead of, and in the same manner as, cortisone or hydrocortisone in the treatment of rheumatoid arthritis and dermatomyositis, or in the same manner as desoxycorticosterone in the treatment of Addison's disease or adrenal insufficiencies. The dosage for such administration is of course dependent on the relative activity of the compound; thus, where the steroid derivative has thirty times the activity of cortisone, the dosage of the former to be employed should be one-thirtieth of the employed dosage of the latter.

For the purpose of illustrating the preferred process of this invention, reference is made to the following schematic analysis employing the 21-acetate esters of 9α-halo-hydrocortisone and 9α-halo-cortisone as starting materials:

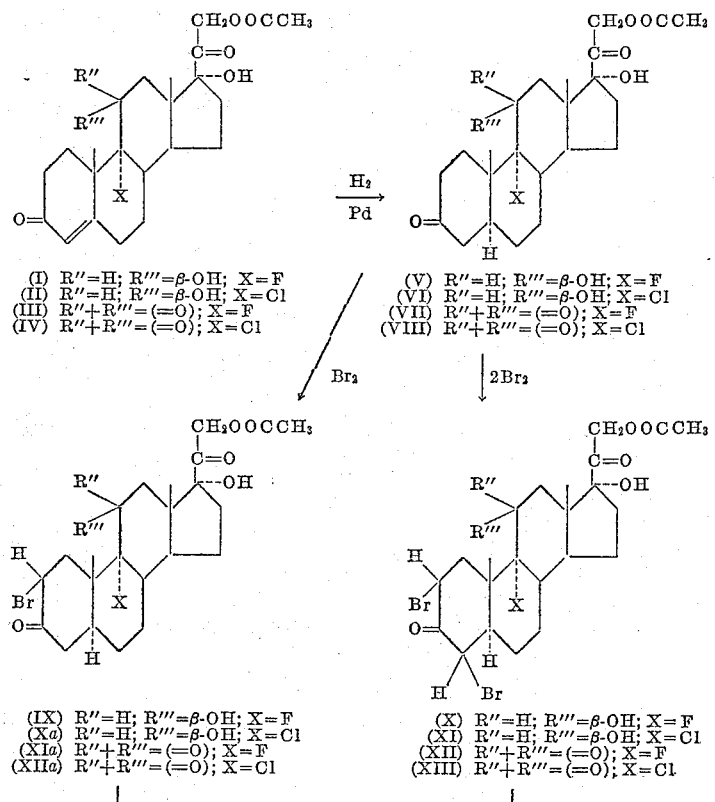

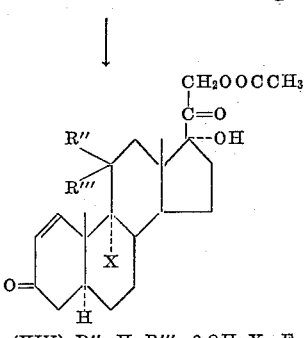

(XIV) R''=H; R'''=β-OH; X=F
(XV) R''=H; R'''=β-OH; X=Cl
(XVI) R''+R'''=(=O); X=F
(XVII) R''+R'''=(=O); X=Cl

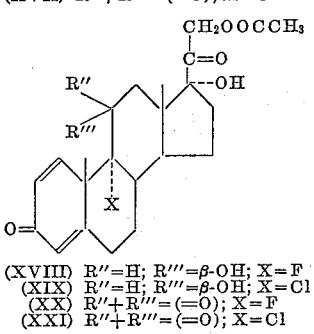

(XVIII) R''=H; R'''=β-OH; X=F
(XIX) R''=H; R'''=β-OH; X=Cl
(XX) R''+R'''=(=O); X=F
(XXI) R''+R'''=(=O); X=Cl and

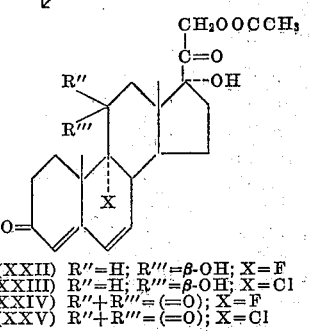

(XXII) R''=H; R'''=β-OH; X=F
(XXIII) R''=H; R'''=β-OH; X=Cl
(XXIV) R''+R'''=(=O); X=F
(XXV) R''+R'''=(=O); X=Cl

The following examples are illustrative of the invention (all temperatures being in centigrade):

EXAMPLE 1

(a) *9α-Fluoroallopregnane-11β,17α,21-Triol-3,20 - Dione 21-Acetate (V) from 9α-Fluorohydrocortisone Acetate (I)*

A solution of 2.5 grams of 9α-fluorohydrocortisone acetate in 75 ml. of 95% alcohol is agitated in an atmosphere of hydrogen at room temperature and ordinary pressure in the presence of 500 mg. of 5% palladium on barium sulfate catalyst. After the absorption of 160.5 ml. of hydrogen, the reduction comes to a standstill. The catalyst is filtered off and the 9α-fluoroallopregnane-11β,17α,21-triol-3,20-dione 21-acetate crystallized by successive concentrations of the filtrate. A total of about 2.17 grams of material approximately (87% of theory) is obtained, having the following properties: M.P., about 236–237°; $[\alpha]_D^{23} +66°$ (c., 0.96 in acetone);

$\lambda_{max}^{Nujol}$ 2.82μ, 2.97μ (OH), 5.75μ (21-acetyl), 5.81μ (20-keto), 5.97μ (3-keto); $\lambda_{max}^{alc.}$ 293μ (ε=110)

*Analysis.*—Calcd. for $C_{23}H_{33}O_6F$ (424.49): C, 65.54; H, 7.87. Found: C, 65.34; H, 7.69.

Essentially the same result is obtained when the hydrogenation is conducted in ethyl acetate. 9α-fluoroallopregnane-11β,17α,21-triol-3,20-dione 21-acetate crystallizes with ethyl acetate of crystallization, and it is desirable in this case to recrystallize from alcohol in order to obtain it free of the ethyl acetate. Other 21-esters of 9α-fluorohydrocortisone such as the propionate valerate, or caprylate, can, of course, be substituted for the 21-acetate in Example 1.

Similarly, if 9α-chlorohydrocortisone acetate (II), 9α-fluorocortisone acetate (III), or 9α-chlorocortisone acetate (IV) is substituted for 9α-fluorohydrocortisone acetate in the procedure of Example 1, 9α-chloroallopregnane-11β,17α,21-triol-3,20 - dione 21 - acetate (VI), 9α-fluoroallopregnane-17α,21-diol-3,11,20-trione 21-acetate (VII), and 9α-chloroallopregnane-17α,21 - diol - 3,11,20-trione 21-acetate (VIII) are formed, respectively.

(b) *2-Bromo-9α - Fluoroallopregnane - 11β,17α,21-Triol-3,20-Dione 21-Acetate (IX) from 9α-Fluoroallopregnane-11β,17α,21-Triol-3,20-Dione 21-Acetate (V)*

A solution of 424 mg. of 9α-fluoroallopregnane-11β, 17α,21-triol-3,20-dione 21-acetate in 25 ml. of glacial acetic acid is treated with a few drops of 1.0 N HBr in acetic acid, and shortly thereafter with a solution of 160 mg. of bromine in 2 ml. of glacial acetic acid. To the colorless solution is added 150 mg. of solid potassium acetate, and the mixture is concentrated to small volume in vacuo. Water and chloroform are added, and after separation of the layers, the chloroform extract is washed with sodium bicarbonate solution and with water; and the 2-bromo-9α-fluoroallopregnane-11β,17α,21 - triol-3,20-dione 21-acetate (IX) is recovered by evaporation of the solvent.

(c) *9α-Fluoro - $\Delta^1$ - Allopregnene-11β,17α,21-Triol-3,20-Dione 21-Acetate (XIV) from 2-Bromo-9α-Fluoro-Allopregnane - 11β,17α,21 - Triol-3,20-Dione 21-Acetate (IX)*

A solution of the resulting residue (IX) obtained in section (b) in 5 ml. of collidine is refluxed for 30 minutes under nitrogen, and then treated with chloroform and sufficient 1 N sulfuric acid to remove all the collidine from the chloroform solution. The chloroform solution is washed with sodium bicarbonate solution and with water and the solvent evaporated in vacuo. Addition of ethyl acetate to the residue (about 421 mg.) leads to crystallization of the desired 9α-fluoro-$\Delta^1$-allopregnene-11β,17α,21-triol-3,20-dione 21-acetate which, after recrystallization from ethyl acetate, has the following properties: M.P. about 237–239°; $[\alpha]_D^{23} +98°$ (c., 1.06 in acetone);

$\lambda_{max}^{alc.}$ 228 mμ (ε=6,100); $\lambda_{max}^{Nujol}$ 2.84μ, 3.00μ (OH); 5.74μ (acetyl); 5.80μ (20-keto); 5.97μ, 6.11μ ($\Delta^1$-3-keto)

*Analysis.*—Calcd. for $C_{23}H_{31}O_6F$ (422.47): C, 65.39; H, 7.39. Found: C, 65.56; H, 7.19.

This substance possesses about three times the activity of cortisone acetate in the rat liver glycogen test. 9α-fluoro-$\Delta^1$-allopregnene-11β,17α,21-triol-3,20-dione 21-acetate can also be prepared by the processes of the following two examples:

EXAMPLE 2

A solution of 500 mg. of 2-bromo-9α-fluoroallopregnane-11β,17α,21-triol-3,20-dione 21-acetate (IX) in 15 ml. of glacial acetic acid is stirred at 50–55° with 240 mg. of dinitrophenylhydrazine for three hours in an atmosphere of nitrogen. The mixture is diluted with water and filtered after several hours' standing in the refrigerator. The crude dinitrophenylhydrazone of 9α-fluoro-Δ¹-allopregnene-11β,17α,21-triol-3,20-dione 21-acetate is decomposed with pyruvic acid in the manner described by Mattox and Kendall, J. Biol. Chem. 185, 601 (1950). The resulting substance is identical in all respects with the product of Example 1.

EXAMPLE 3

A solution of 500 mg. of 2-bromo-9α-fluoroallopregnane-11β,17α,21-triol-3,20-dione 21-acetate (IX) and 130 mg. of lithium chloride in 5 ml. of dimethylformamide is heated for 2 hours on the steam cone. The mixture is diluted with water, and the resulting suspension is extracted with chloroform. The chloroform extract is washed with water, sodium bicarbonate and again with water and the solvent evaporated in vacuo. The residue, on crystallization from ethyl acetate, furnishes pure 9α-fluoro-Δ¹-allopregnane-11β,17α,21-triol-3,20-dione 21-acetate having the properties shown in Example 1.

Similarly, if 9α-chloroallopregnane-11β,17α,21-triol-3,20-dione 21-acetate (VI), 9α-fluoroallopregnane-17α,21-diol-3,11,20-trione 21-acetate (VII), or 9α-chloroallopregnane-17α,21-diol-3,11,20-trione 21-acetate (VIII) is substituted for 9α-fluoroallopregnane-11β,17α,21-triol-3,20-dione 21-acetate (V) in section (b) of Example 1, the intermediate steroids produced, respectively, are 2-bromo-9α-chloroallopregnane-11β,17α,21-triol-3,20-dione 21-acetate (Xa), 2-bromo-9α-fluoro-allopregnane-17α,21-diol-3,11,20-trione 21-acetate (XIa), and 2-bromo-9α-chloroallopregnane-17α,21-diol-3,11,20-trione 21-acetate (XIIa). These intermediates can then be converted to 9α-chloro-Δ¹-allopregnene-11β,17α,21-triol-3,20-dione 21-acetate (XV), 9α-fluoro-Δ¹-allopregnene-17α,21-diol-3,11,20-trione 21-acetate (XVI), and 9α-chloro-Δ¹-allopregnene-17α,21-diol-3,11,20-trione 21-acetate (XVII), respectively, by the processes of Examples 1 (section c), 2 or 3.

EXAMPLE 4

9α-Fluoro-Δ¹,⁴-Pregnadiene - 11β,17α,21-Triol-3,20-Dione 21-Acetate (XVIII) and 9α-Fluoro-Δ⁴,⁶-Pregnadiene-11β,17α,21-Triol-3,20-Dione 21-Acetate (XXII) from 9α-Fluoroallopregnane-11β,17α,21 - Triol - 3,20-Dione 21-Acetate (V)

To a solution of 2.120 grams of 9α-fluoroallopregnane-11β,17α,21-triol-3,20-dione 21-acetate in 100 ml. of glacial acetic acid is added 0.05 ml. of 1.3 N hydrobromic acid in acetic acid, and then dropwise with stirring a solution of 1.52 g. of bromine in 19 ml. of acetic acid. After standing at room temperature for one hour, 1.1 g. of potassium acetate is added, and the mixture concentrated in vacuo to small volume. After the addition of water, the suspension is extracted with chloroform and the chloroform solution washed with water, sodium bicarbonate solution and again with water. Removal of the solvent in vacuo leaves the crude 2,4-dibromo-9α-fluoroallopregnane-11β,17α,21-triol-3,20-dione 21-acetate (X) as an amorphous residue, which is debrominated with collidine without further purification. For this purpose it is dissolved in 25 ml. of collidine and refluxed for 30 minutes in an atmosphere of nitrogen. The mixture is diluted with chloroform and the collidine removed by extraction with dilute sulfuric acid. After washing with sodium bicarbonate solution and water, the chloroform solution is dried over sodium sulfate and evaporated to dryness in vacuo. The residue is dissolved in 16 ml. of chloroform and the resulting solution diluted with 48 ml. of benzene. The mixture is centrifuged and chromatographed on 30 g. of sulfuric acid-washed alumina. Elution of the column with 1 part of chloroform and 3 parts of benzene produces a mixture of by-products, which is followed by 9α-fluoro-Δ⁴,⁶-pregnadiene-11β,17α,21-triol-3,20-dione 21-acetate (XXII) when the eluting fluid is changed to a mixture of equal parts of chloroform and benzene. Recrystallization of the combined fractions from ethyl acetate affords the pure substance having the following properties: M.P. about 209–211°; $[\alpha]_D^{23}$ +139° (c., 0.76 in CHCl$_3$);

$\lambda_{max.}^{alc.}$ 281 mμ ($\epsilon$=23,000); $\lambda_{max.}^{Nujol}$ 2.86μ, 3.02μ (OH), 5.76μ (acetyl), 5.80μ (20-keto), 6.07μ, 6.12μ, 6.20μ (Δ⁴,⁶-3-ketone)

*Analysis.*—Calcd. for C$_{23}$H$_{29}$O$_6$F (420.46): C, 65.70; H, 6.95. Found: C, 65.75; H, 7.04.

9α-fluoro-Δ⁴,⁶-pregnadiene - 11β,17α,21-triol-3,20-dione 21-acetate possesses about 7 times the activity of cortisone acetate in the rat liver glycogen test.

Continued elution of the chromatographic column with a mixture of 3 parts of chloroform and 1 part of benzene affords 9α-fluoro-Δ¹,⁴-pregnadiene-11β,17α,21-triol-3,20-dione 21-acetate (XVIII), which after crystallization from acetone-hexane has the following properties: M.P. about 241–244°; $[\alpha]_D^{23}$ +99° (c., 0.34 in acetone);

$\lambda_{max.}^{alc.}$ 238 mμ ($\epsilon$=14,700); $\lambda_{max.}^{Nujol}$ 2.93μ 3.02μ (OH), 5.76μ (acetyl), 5.85μ (20-keto), 6.02μ, 6.19μ, 6.26μ (Δ¹,⁴-3-ketone)

*Analysis.*—Calcd. for C$_{23}$H$_{29}$O$_6$F (420.46): C, 65.70; H, 6.95. Found: C, 65.88; H, 7.20.

9α - fluoro - Δ¹,⁴ - pregnadiene - 11β,17α,21 - triol - 3,20-dione 21-acetate possesses about 30 times the activity of cortisone acetate in the rat liver glycogen assay.

9α - fluoro - Δ¹,⁴ - pregnadiene - 11β,17α,21 - triol - 3,20-dione 21-acetate and its Δ⁴,⁶-isomer can also be produced by the procedure of the following example:

EXAMPLE 5

A solution of 600 mg. of 2,4-dibromo-9α-fluoroallopregnane-11β,17α,21-triol-3,20-dione 21-acetate (X) and 255 mg. of lithium chloride in 5 ml. of dimethylformamide is heated on the steam cone for 2 hours in an atmosphere of nitrogen. The mixture is diluted with water and the resulting suspension extracted with chloroform. The chloroform solution is washed with water, sodium bicarbonate solution and again with water, dried over sodium sulfate and evaporated to dryness in vacuo. The resulting residue, on chromatography as described in Example 4, furnishes the desired substances in pure form.

9α - fluoro - Δ⁴,⁶ - pregnadiene-11β,17α,21-triol - 3,20-dione 21-acetate is also obtained when 2,4-dibromo-9α-fluoroallopregnane-11β,17α,21-triol-3,20-dione 21-acetate is treated with dinitrophenylhydrazine (or with semicarbazide) as described in Example 2 for the corresponding monobromo compound, and the resulting dinitrophenylhydrazone (or semicarbazone) is decomposed with 90% pyruvic acid.

Similarly, if 9α-chloroallopregnane-11β,17α,21-triol-3,20-dione 21-acetate (VI), 9α-fluoroallopregnane-17α,21-diol-3,11,20-trione 21-acetate (VII), or 9α-chloroallopregnane-17α,21-diol-3,11,20-trione 21-acetate (VIII) is substituted for 9α-fluoroallopregnane-11β,17α,21-triol-3,20-dione 21-acetate in the process of Example 4, the intermediates 2,4-dibromo-9α-chloroallopregnane-11β,17α,21-triol-3,20-dione 21-acetate (XI), 2,4-dibromo-9α-fluoroallopregnane - 17α,21 - diol - 3,11,20-trione 21-acetate (XII), and 2,4-dibromo-9α-chloroallopregnane-17α,21-diol-3,11,20-trione 21-acetate (XIII) are obtained, respectively. These dibrominated intermediates can then be converted to a mixture of their respective Δ¹,⁴-pregnadienes (XIX to XXI) and Δ⁴,⁶-pregnadienes (XXIII to XXV) by the procedures of Examples 4 and 5.

Furthermore, if another 9α-halo steroid of the pregnane series is substituted for the 9α-halohydrocortisones (acetate) and 9α-halocortisones (acetate) employed as described hereinbefore, the corresponding Δ¹, Δ¹,⁴, and Δ⁴,⁶ derivatives are obtained. Thus, 9α-fluorocorticosterone acetate yields 9α-fluoro-Δ¹-allopregnene-11β,21- diol - 3,20 - dione 21-acetate, 9α-fluoro-Δ$^{1,4}$-pregnadiene-11β,21 - diol - 3,20-dione 21-acetate and 9α-fluoro-Δ$^{4,6}$-pregnadiene-11β,21-diol-3,20-dione 21-acetate; 9α-chlorocorticosterone acetate yields 9α-chloro-Δ$^{1}$-allopregnene-11β,21 - diol - 3,20-dione 21-acetate, 9α-chloro-Δ$^{1,4}$-pregnadiene-11β,21-diol-3,20-dione 21-acetate and 9α-chloro-Δ$^{4,6}$-pregnadiene - 11β,21 - diol-3,20-dione 21-acetate; 9α-fluoro-11-dehydrocorticosterone acetate yields 9α-fluoro-Δ$^{1}$-allopregnene-21-ol-3,11,20 - trione 21 - acetate, 9α-fluoro-Δ$^{1,4}$-pregnadiene-21-ol-3,11,20-trione 21-acetate and 9α - fluoro - Δ$^{4,6}$-pregnadiene-21-ol-3,11,20-trione 21-acetate; 9α-chloro-11-dehydrocorticosterone acetate yields 9α - chloro - Δ$^{1}$-allopregnene-21-ol-3,11,20-trione 21-acetate, 9α-chloro-Δ$^{1,4}$-pregnadiene-21-ol-3,11,20-trione 21-acetate and 9α-chloro-Δ$^{4,6}$-pregnadiene-21-ol-3,11,20-trione 21-acetate; 9α-fluoro-11β,17α-dihydroxyprogesterone yields 9α - fluoro-Δ$^{1}$-allopregnene-11β,17α-diol-3,20-dione, 9α - fluoro - Δ$^{1,4}$-pregnadiene-11β,17α-diol-3,20-dione and 9α - fluoro - Δ$^{4,6}$-pregnadiene-11β,17α-diol-3,20-dione; 9α-fluoro-11β-hydroxyprogestrone yields 9α-fluoro-Δ$^{1}$-allopregnene - 11β - ol-3,20-dione, 9α-fluoro-Δ$^{1,4}$-pregnadiene-11β-ol-3,20-dione, and 9α-fluoro-Δ$^{4,6}$-pregnadiene-11β-ol-3,20-dione; 9α-chloro-11β-hydroxyprogesterone yields 9α-chloro-Δ$^{1}$-allopregnene-11β-ol-3,20-dione, 9α-chloro-Δ$^{1,4}$-pregnadiene - 11β-ol-3,20-dione and 9α-chloro-Δ$^{4,6}$-pregnadiene-11β-ol-3,20-dione; and 9α-fluoro-11-ketoprogesterone yields 9α-fluoro-Δ$^{1}$-allopregnene-3,11,20-trione, 9α-fluoro-Δ$^{1,4}$-pregnadiene-3,11,20-trione and 9α-fluoro-Δ$^{4,6}$-pregnadiene-3,11,20-trione.

The 21-esterifying group may be hydrolyzed by heating the steroid with an alkali metal salt of a weak acid (e.g. potassium carbonate or potassium bicarbonate) in an organic solvent (e.g. methanol) to yield the free 21-ol. By this method the 9α-halo-Δ$^{1}$-(or Δ$^{1,4}$ or Δ$^{4,6}$)-allopregnene-(or pregnadiene) - 11β,17α,21-triol-3,20-dione-(or 17α,21-diol-3,11,20-trione) 21-acetates are converted to the free 21-ols.

If an 11β-hydroxy steroid is used as the starting material, the resulting 11β-hydroxy products may be oxidized to the corresponding 11-keto derivatives by treating the products with an oxidizing agent such as chromic oxide.

The 9α-bromo Δ$^{1}$, Δ$^{1,4}$, and Δ$^{4,6}$ steroids of this invention (and 9α-iodo derivatives) are preferably prepared indirectly from corresponding Δ$^{1}$ (or Δ$^{1,4}$, or Δ$^{4,6}$) 9α-chloro 11β-hydroxy steroids by way of the Δ$^{1}$ (or Δ$^{1,4}$, or Δ$^{4,6}$) 9β,11β-oxido intermediates of this invention, the preferred 9β,11β-oxido intermediates being those of the general formula

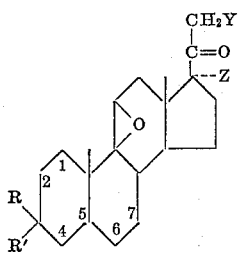

wherein one of the positions 1,2 and 6,7 is double-bonded, the 4,5 position is double-bonded or saturated (preferably double-bonded), and wherein R, R$^{1}$, Z and Y are as hereinbefore defined. Thus, the Δ$^{1}$ (or Δ$^{1,4}$, or Δ$^{4,6}$) 9α-chloro 11β-hydroxy steroid is reacted with a salt of a strong base and a weak acid, such as an alkali metal carbonate (e.g., potassium carbonate) or an alkali metal alkoxide (e.g. sodium methoxide), and the corresponding Δ$^{1}$ (or Δ$^{1,4}$, or Δ$^{4,6}$) 9β,11β-oxido compound thus formed is then reacted with a hydrogen halide (e.g. hydrobromic acid or hydroiodic acid) to form the corresponding Δ$^{1}$ (or Δ$^{1,4}$, or Δ$^{4,6}$) 9α-halo 11β-hydroxy derivative. The series of steps can be represented by the following schematic analysis and examples:

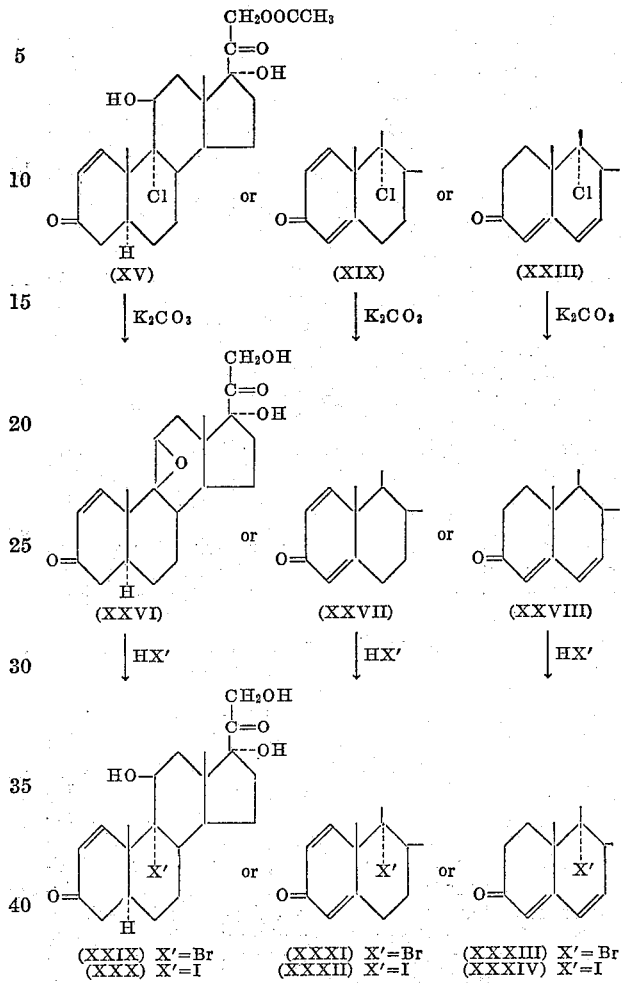

It should be noted that if the 9α-chloro steroid has an esterified hydroxy group in the 21-position, this group is hydrolyzed, and a free 21-ol is produced. The 21-hydroxy group can, however, later be esterified by treatment with the desired acyl halide or acid anhydride to form either a 21-esterified 9β,11β-oxido or 21-esterified 9α-halo derivative.

EXAMPLE 6

(a) 9β,11β - Oxido-Δ$^{1}$-Allopregnene-17α,21-Diol-3,20-Dione (XXVI) from 9α-Chloro-Δ$^{1}$-Allopregnene-11β,17α,21,Triol,3,20-Dione 21-Acetate (XV)

To a solution of 100 mg. of 9α-chloro-Δ$^{1}$-allopregnene-11β,17α,21-triol-3,20-dione 21-acetate in 10 ml. of methanol is added a solution of 100 mg. of potassium carbonate in 0.5 ml. of oxygen-free water. Nitrogen is passed through the resulting solution for 5 minutes, and the mixture is allowed to remain at room temperature for three hours. Acetic acid is added to neutralize the carbonate, and after the addition of 5 ml. water, the methanol is removed in vacuo. The remaining aqueous suspension is extracted with chloroform, the chloroform extract washed with water and dried over sodium sulfate. Evaporation of the solvent leaves a residue of the desired 9β,11β-epoxide.

In a similar manner, by using 9α-chloro-Δ$^{1,4}$-pregnadiene-11β,17α,21-triol-3,20-dione 21-acetate (XIX) or 9α-chloro-Δ$^{4,6}$-pregnadiene - β,17α,21-triol-3,20-dione 21-acetate (XXIII) as a starting material, 9β,11β-oxido-Δ$^{1,4}$ - pregnadiene - 17α,21-diol-3,20-dione (XXVII) and 9β,11β - oxido - Δ$^{4,6}$ - pregnadiene - 17α,21 - diol - 3, 20-dione (XXVIII) are formed, respectively.

(b) 9α - Bromo - Δ¹-Allopregnene-11β,17α,21-Triol-3,20-Dione (XXIX) from 9β,11β-Oxido-Δ¹-Allopregnene-17α,21-Diol-3,20-Dione (XXVI)

To a solution of 25 mg. of 9β,11β-oxido-Δ¹-allopregnene-17α,21-diol-3,20-dione in 1 ml. of chloroform is added with shaking at room temperature 0.04 ml. 30% hydrobromic acid in glacial acetic acid. After 10 minutes, 10 ml. of chloroform is added, and the mixture is extracted with dilute sodium bicarbonate and with water. The chloroform solution is dried over sodium sulfate, and evaporated to dryness in vacuo; and the residue, 9α - bromo-Δ¹-allopregnene-11β,17α,21-triol-3,20-dione, is crystallized from acetone.

In a similar manner, by substituting 60% aqueous hydroiodic acid for hydrobromic acid in section (b) of Example 6, the corresponding 9α-iodo compound (XXX) is formed.

Similarly, the 9β,11β-oxido steroids XXVII and XXVIII can be converted to the corresponding 9α-bromo and 9α-iodo derivatives (XXXI to XXXIV) by the method of Example 6. Furthermore, the 9α-bromo and 9α-iodo 11β-hydroxy derivatives obtained can be oxidized to the corresponding 9α-bromo or 9α-iodo 11-keto derivatives by reaction with chromic acid.

Another utilizable process for preparing the steroids of this invention comprises brominating an 11α-hydroxy steroid of the allopregnane series (after hydrogenating the steroid, if there is unsaturation in the 4,5-position, as for example by means of hydrogen in the presence of a palladium catalyst with or without a carrier such as barium sulfate, and separating the allopregnane isomer from the coproduced pregnane derivative) to form either a 2-monobromo or 2,4-dibromo derivative. Suitable starting steroids for this process include 11α-hydroxyprogesterone, 11α,17α - dihydroxyprogesterone, the 21-esters (e.g. 21-acetate) of epicorticosterone, and the 21-esters (e.g. 21-acetate) of Δ⁴-pregnene-11α,17α,21-triol-3,20-dione (also known as epi F), as well as the 4,5-dihydro derivatives of each of these. These bromo derivatives are then dehydrobrominated by heating with a base, such as collidine with or without a lithium halide salt, or with a lithium halide salt in a lower fatty acid amide (e.g. dimethylformamide) to form the corresponding Δ¹-allopregnene derivative, when a 2-monobromo steroid is used, and a mixture of the corresponding Δ¹,⁴ and Δ⁴,⁶-pregnadiene derivatives, when a 2,4-dibromo derivative is employed. These Δ¹, Δ¹,⁴, and Δ⁴,⁶-11α-hydroxy derivatives are then subjected to the conversion disclosed for 11α-hydroxy derivatives in said applications, Serial Nos. 417,489 and 343,243, to obtain the compounds of this invention. Thus, the 11α-hydroxy allopregnenes or pregnadienes, unsaturated in either the 1,2 or 6,7-position, are reacted with a sulfonyl halide, such as tosyl chloride, to form the corresponding 11α-sulfonyloxy (e.g. 11α-tosyloxy) derivatives, which in turn are heated, for example, with sodium acetate and acetic acid, to form the corresponding Δ⁹⁽¹¹⁾-derivatives. These derivatives are then hydroxybrominated, with say N-bromoacetamide, to form the corresponding 9α-bromo-11β-hydroxy derivatives, which in turn can be oxidized with chromic oxide to form the corresponding 9α-bromo-11-keto derivatives, or can be converted with potassium acetate to the corresponding 9β,11β-oxido derivatives. These 9β,11β-oxido derivatives can then be reacted with a hydrogen halide, such as hydrofluoric acid, hydrochloric acid or hydroiodic acid to form the corresponding 9α-halo-11β-hydroxy derivatives, and these derivatives can then be oxidized with chromic oxide to the corresponding 9α-halo-11-keto derivatives.

The preparation of 11α-hydroxy-Δ¹,⁴-pregnadienes or 11α-hydroxy-Δ⁴,⁶-pregnadienes utilizable in the foregoing process of this invention is illustrated by the following example, wherein Δ¹,⁴-pregnadiene-11α,17α,21-triol-3,20-dione 21-acetate and Δ⁴,⁶-pregnadiene-11α,17α,21-triol-3,20-dione 21-acetate are prepared from Δ⁴-pregnene-11α,17α,21-triol-3,20-dione.

EXAMPLE 7

A solution of 8.0 g. of Δ⁴-pregnene-11α,17α,21-triol-3,20-dione in 500 ml. of 95% alcohol is shaken in an atmosphere of hydrogen at room temperature and ordinary pressure in the presence of 1 g. of a 5% Pd on charcoal catalyst. After the absorption of 630 ml. of hydrogen, the reduction comes to a standstill. The catalyst is filtered off and the solvent removed completely in high vacuum. The mixture of pregnane-11α,17α,21-triol-3,20-dione and the corresponding allopregnane is separated chromatographically as described in U.S. Patent No. 2,659,744.

720 mg. of the allopregnane-11α,17α,21-triol-3,20-dione thus recovered is acetylated in the 21-position only by dissolving it in 5 ml. of dry pyridine and adding to the solution 210 mg. of acetic anhydride. After 18 hours at room temperature, the mixture is diluted with water and chloroform. The chloroform extract is washed with water, 1 N hydrochloric acid, sodium bicarbonate and again with water, dried over sodium sulfate and the solvent removed in vacuo.

The resulting allopregnane-11α,17α,21-triol-3,20-dione 21-acetate is dissolved in 40 ml. of glacial acetic acid and to the solution is added slowly with stirring 7.6 ml. of a solution of bromine in acetic acid (80 mg. Br₂/ml.). When all the bromine has been adsorbed, 370 mg. of solid potassium acetate is added and the mixture concentrated to a small volume in vacuo. Water and chloroform is added and after separation of the layers, the chloroform extract is washed with sodium bicarbonate solution and with water, dried over sodium sulfate and evaporated to dryness in vacuo. The residue, consisting essentially of 2,4-dibromo-allopregnane-11α-17α,21-triol-3,20-dione 21-acetate, is dissolved in 10 ml. of collidine and the resulting solution boiled under reflux for ¾ hour in an atmosphere of nitrogen. The mixture is then treated with chloroform and sufficient 1 N hydrochloric acid to remove all the collidine from the chloroform solution and the latter washed with sodium bicarbonate solution and water. Evaporation of the solvent in vacuo leaves a residue, from which the desired Δ¹,⁴-pregnadiene-11α,17α,21-triol-3,20-dione 21-acetate is separated by chromatography on 12 g. of sulfuric acid-washed alumina. For this purpose, the residue is dissolved in 4 ml. of chloroform and 12 ml. of benzene, poured on the column and the latter eluted with a solvent mixture containing 1 volume of chloroform and three volumes of benzene, which removes some amorphous material. When the eluate is changed to chloroform Δ⁴,⁶-pregnadiene-11α,17α,21-triol-3,20-dione 21-acetate is eluted, followed by Δ¹,⁴-pregnadiene-11α,17α,21-triol-3,20-dione 21-acetate.

The Δ¹,⁴-pregnadiene-11α,17α,21-triol-3,20-dione 21-acetate is characterized further by conversion into its 11α,21-diacetate, having the following properties: M.P. about 233–234°; $[\alpha]_D^{23}$ +97° (c., 0.70 in chloroform).

$\lambda_{max.}^{alc.}$ 244 mμ (ε=16,400); $\lambda_{max.}^{Nujol}$ 3.08μ, 5.75μ (acetyl), 5.79μ (20-keto), 6.05μ, 6.23μ (Δ¹,⁴-3-ketone)

The invention may be variously otherwise embodied within the scope of the appended claims.

I claim:

1. A steroid of the formula

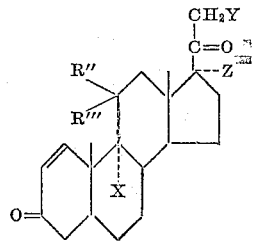

wherein individually R" is hydrogen, R''' is β-hydroxy and together R" and R''' is keto; X is an α-halogen group; Z is selected from the group consisting of hydrogen and α-hydroxy; and Y is selected from the group consisting of hydrogen, hydroxy and lower alkanoyloxy.

2. A compound selected from the class consisting of 9α-halo-Δ¹-allopregnene-11β,17α,21-triol-3,20-dione and 21-lower alkanoyl esters thereof.

3. A compound selected from the class consisting of 9α-halo-Δ¹-allopregnene-17α,21-diol-3,11,20-trione and 21-lower alkanoyl esters thereof.

4. A steroid of the formula

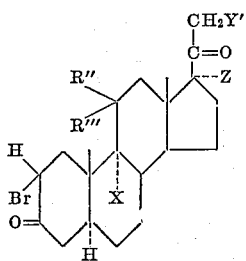

wherein individually R" is hydrogen, R''' is β-hydroxy and together R" and R''' is keto; X is an α-halogen having an atomic number no higher than 35; Z is selected from the group consisting of hydrogen and α-hydroxy; and Y' is selected from the group consisting of hydrogen and lower alkanoyloxy.

5. A 21-lower alkanoyl ester of a 2-bromo-9α-halo-allopregnane-11β,17α,21-triol-3,20-dione, wherein the halo group has an atomic number no higher than 35.

6. A steroid of the formula

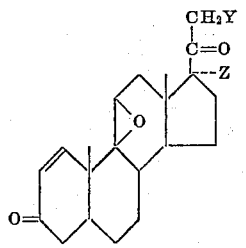

wherein Z is selected from the group consisting of hydrogen and α-hydroxy; and Y is selected from the group consisting of hydrogen, hydroxy, and lower alkanoyloxy.

7. A compound selected from the class consisting of 9β,11β-oxido-Δ¹-allopregnene-17α,21-diol-3,20-dione and 21-lower alkanoyl esters thereof.

8. 9α-fluoro-Δ¹-3,11,20-triketo-17α-hydroxy-21-lower alkanoyloxy-allopregnene.

9. 9α-fluoro-Δ¹-3,11,20-triketo-17α,21-dihydroxy allopregnene.

10. 9α-fluoro-Δ¹-3,11,20-triketo-17α,21-dihydroxy-allopregnene 21-acetate.

11. 9α-fluoro-Δ¹-3,20-diketo-11β,17α-dihydroxy-21-lower alkanoyloxy-allopregnene.

12. 9α-fluoro-Δ¹-3,20-diketo-11β,17α,21-trihydroxy-allopregnene.

13. 9α-fluoro-Δ¹-3,20-diketo-11β,17α,21-trihydroxy-allopregnene 21-acetate.

14. A steroid selected from the group consisting of 11-keto and 11β-hydroxy-9α-halo-Δ¹-pregnenes having a keto group at the 3- and 20-positions, a member of the group consisting of H and OH at the 17α-position, a member of the group consisting of hydroxy and lower alkanoyloxy at the 21-position and characterized by the presence of a double bond only in the 1-position.

15. A steroid selected from the group consisting of 11-keto and 11β-hydroxy allopregnanes having a keto group at the 3- and 20-positions, a member of the group consisting of H and OH at the 17α-position, a member of the group consisting of hydroxy and lower alkanoyloxy at the 21-position and characterized by the presence of a bromine atom at the 2-position and a halogen having an atomic number no higher than 35 in the 9α-position.

16. A steroid selected from the group consisting of Δ¹-pregnenes having a keto group at the 3- and 20-positions, a member of the group consisting of H and OH at the 17α-position, a member of the group consisting of hydroxy and lower alkanoyloxy at the 21-position and characterized by the presence of a 9β,11β-oxido group and a double bond only in the 1-position.

References Cited in the file of this patent
UNITED STATES PATENTS

| | | |
|---|---|---|
| 2,767,199 | Djerassi et al. | Oct. 16, 1956 |
| 2,837,464 | Nobile | June 3, 1958 |
| 2,897,216 | Oliveto et al. | July 28, 1959 |
| 2,933,515 | Wilson et al. | Apr. 19, 1960 |
| 2,957,893 | Herzog et al. | Oct. 25, 1960 |